(12) United States Patent
Tripp et al.

(10) Patent No.: US 10,456,827 B2
(45) Date of Patent: Oct. 29, 2019

(54) INTERCHANGEABLE DIE TRANSFER STATION, JOINING TOOL SYSTEM AND JOINING METHOD

(71) Applicant: NEWFREY LLC, New Britain, CT (US)

(72) Inventors: Andreas Tripp, Giessen (DE); Timo Kohlstaedt, Giessen (DE); Joachim Moeser, Giessen (DE)

(73) Assignee: NEWFREY LLC, New Britain, CT (US)

( * ) Notice: Subject to any disclaimer, the term of this patent is extended or adjusted under 35 U.S.C. 154(b) by 408 days.

(21) Appl. No.: 15/185,726

(22) Filed: Jun. 17, 2016

(65) Prior Publication Data

US 2016/0288198 A1 Oct. 6, 2016

Related U.S. Application Data

(63) Continuation of application No. PCT/EP2014/076387, filed on Dec. 3, 2014.

(30) Foreign Application Priority Data

Dec. 18, 2013 (DE) .................. 10 2013 021 055

(51) Int. Cl.
*B23Q 3/155* (2006.01)
*B21J 15/36* (2006.01)
*B21J 15/02* (2006.01)

(52) U.S. Cl.
CPC ............ *B21J 15/36* (2013.01); *B21J 15/025* (2013.01); *B23Q 3/15566* (2013.01); *Y10T 29/5118* (2015.01); *Y10T 483/1731* (2015.01)

(58) Field of Classification Search
CPC ........ B23Q 3/155–15793; B23Q 3/157; B23Q 3/15566; Y10T 483/1729; Y10T 483/1731; Y10T 29/49833–49837; Y10T 29/49943; Y10T 29/5118; Y10T 29/53709–53778; B21J 15/36; B21J 15/025

See application file for complete search history.

(56) References Cited

U.S. PATENT DOCUMENTS

| | | | | |
|---|---|---|---|---|
| 3,028,770 A | * | 4/1962 | Pittwood | B23B 31/00 279/900 |
| 4,587,716 A | * | 5/1986 | Bytow | B21D 37/145 483/14 |
| 4,967,947 A | * | 11/1990 | Sarh | B21J 15/14 227/156 |
| 5,176,604 A | * | 1/1993 | Sakamura | B21J 13/085 483/29 |

(Continued)

FOREIGN PATENT DOCUMENTS

DE 10335085 A1 2/2005
DE 202006013082 U 11/2006

*Primary Examiner* — Sunil K Singh
*Assistant Examiner* — Yasir A Diab
(74) *Attorney, Agent, or Firm* — Michael P. Leary

(57) ABSTRACT

A transfer station for temporarily storing at least one interchangeable die. The die can be removed by a joining tool to carry out a joining operation, and can be returned back into the transfer station after the joining operation. The transfer station including a die receptacle for holding the die, and a rotating device for rotating the die in the receptacle in order to establish an axial engagement between the die and the joining tool.

7 Claims, 7 Drawing Sheets

(56) References Cited

U.S. PATENT DOCUMENTS

| | | | | |
|---|---|---|---|---|
| 5,318,496 A * | 6/1994 | Takahashi | .............. | B21D 28/12 |
| | | | | 483/1 |
| 5,669,866 A * | 9/1997 | Julian | .................. | B21D 28/246 |
| | | | | 483/1 |
| 5,680,790 A * | 10/1997 | Richardson | ............ | B21J 15/046 |
| | | | | 29/243.53 |
| 6,106,446 A * | 8/2000 | Kelly | ........................ | B21J 15/10 |
| | | | | 227/107 |
| 6,200,245 B1 * | 3/2001 | Dodo | ................. | B21B 15/0042 |
| | | | | 483/1 |
| 6,200,246 B1 * | 3/2001 | Perazzolo | .............. | B21D 28/12 |
| | | | | 483/28 |
| 2007/0163414 A1 * | 7/2007 | Senda | .................... | B21D 28/12 |
| | | | | 83/684 |
| 2008/0290614 A1 * | 11/2008 | Yang | .................... | B23B 31/201 |
| | | | | 279/155 |
| 2009/0139375 A1 * | 6/2009 | Hathaway | ........... | B23B 31/1071 |
| | | | | 81/54 |

* cited by examiner

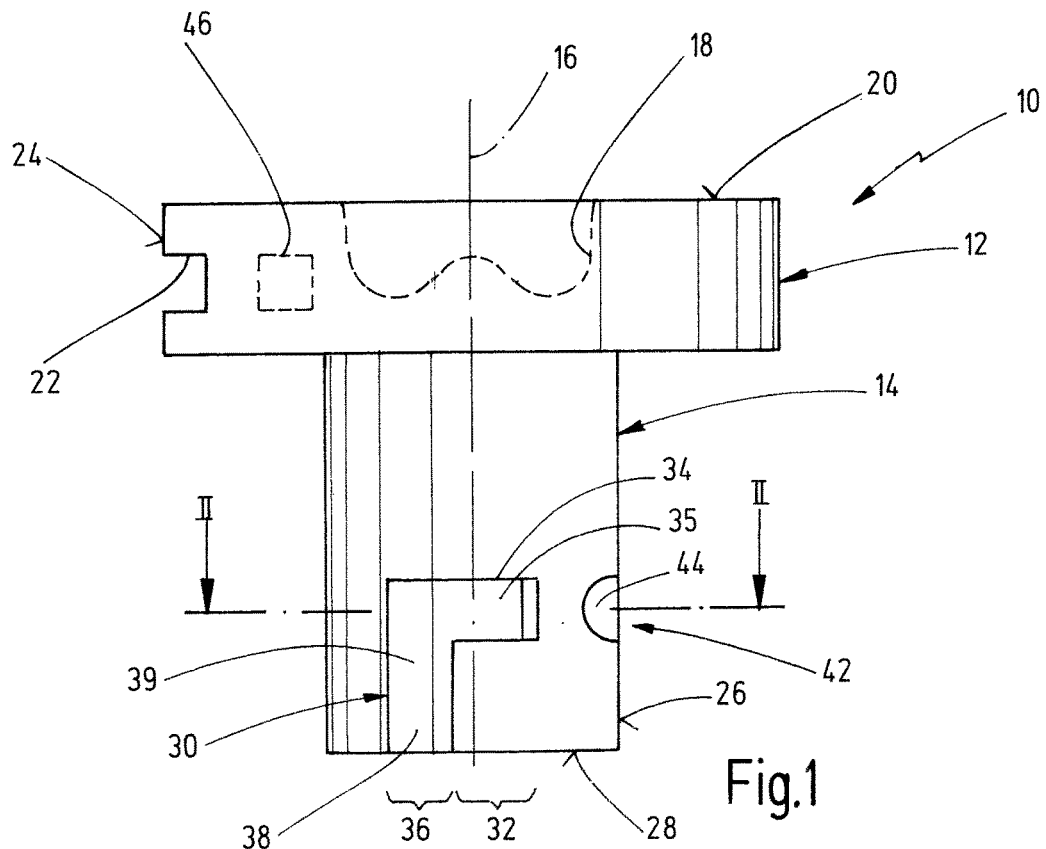
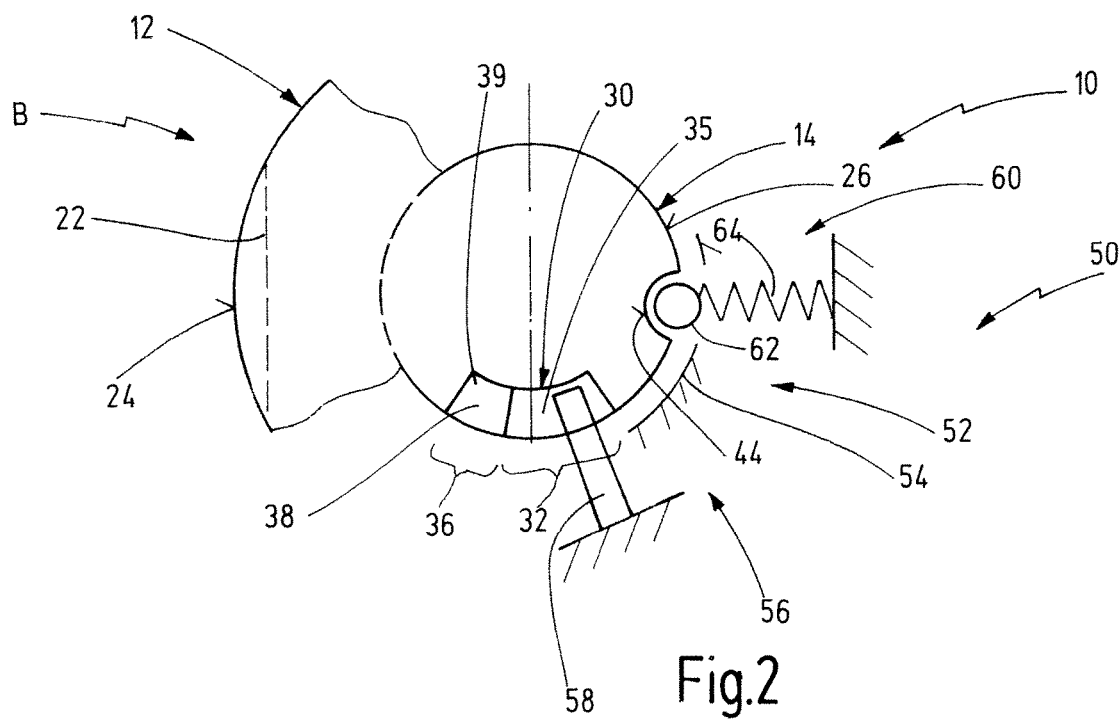

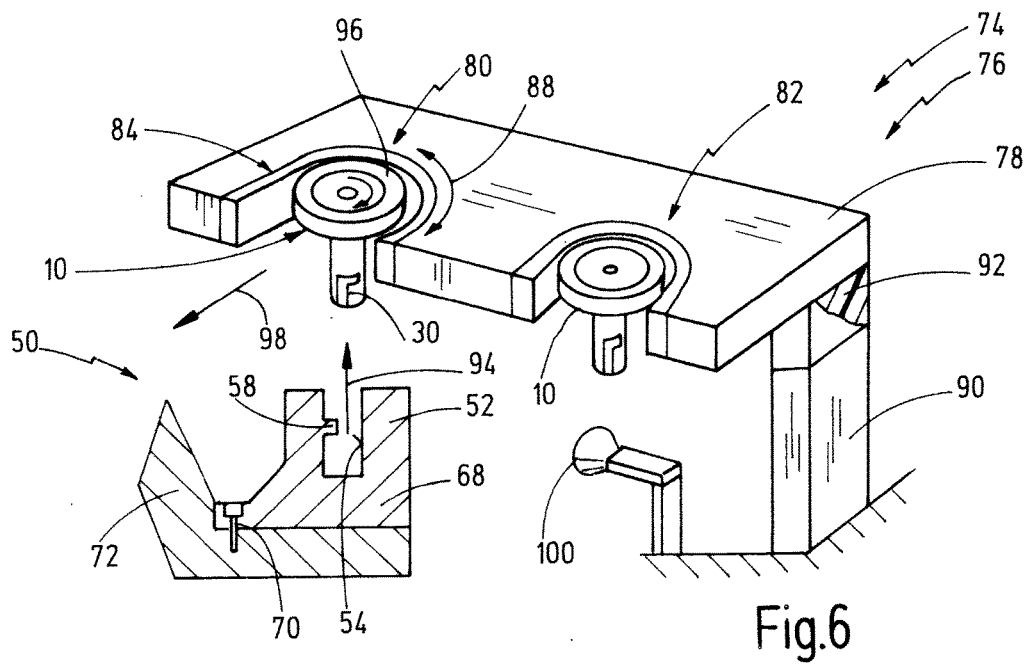
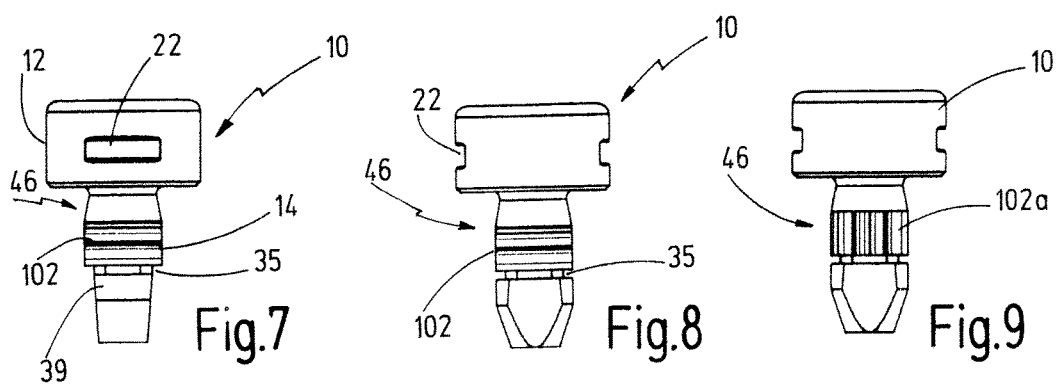
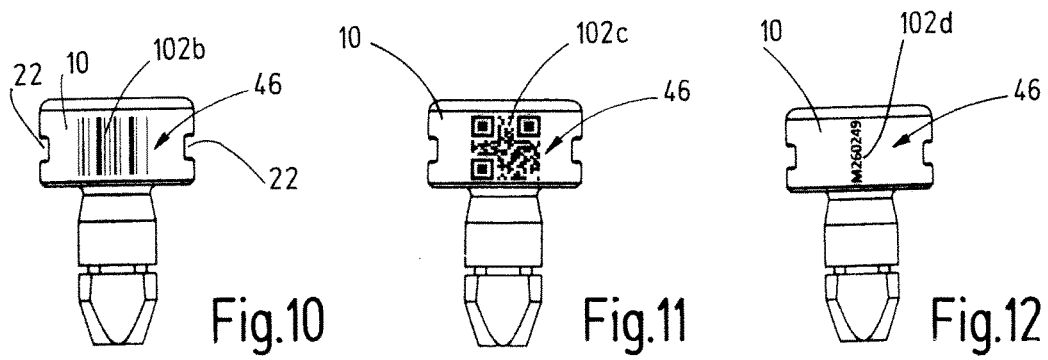

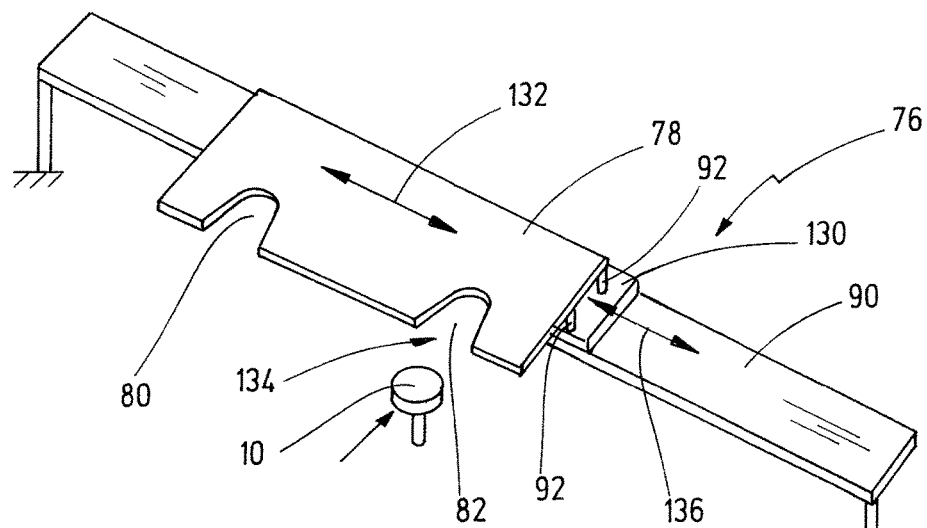
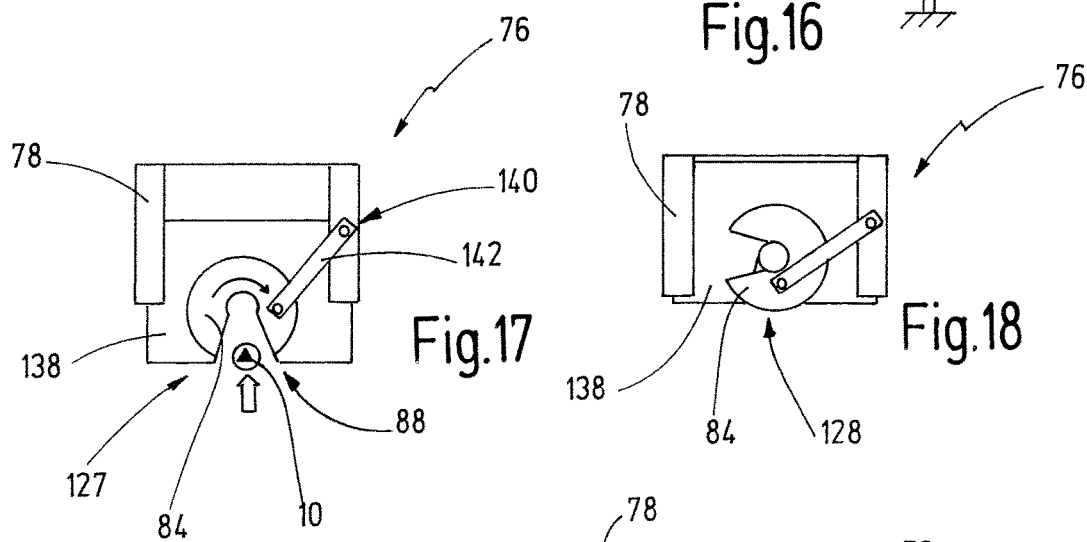
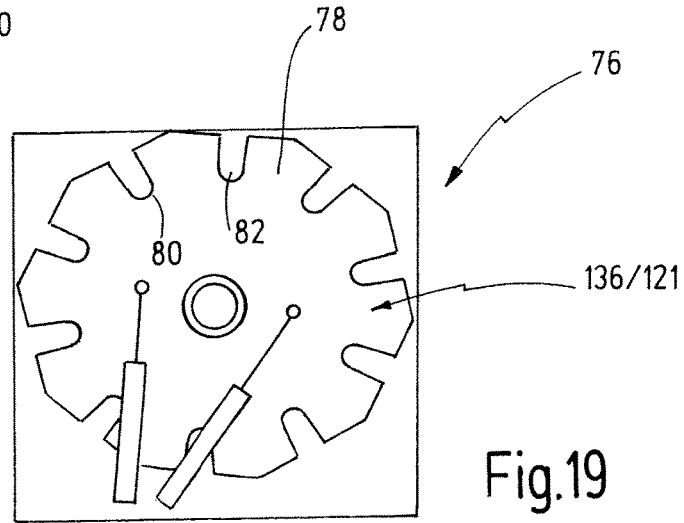

INTERCHANGEABLE DIE TRANSFER STATION, JOINING TOOL SYSTEM AND JOINING METHOD

CROSS-REFERENCE TO RELATED APPLICATIONS

This application is a continuation of international application PCT/EP2014/076387, filed Dec. 3, 2014 which claims priority from German Patent Application No. DE102013021055.0 filed Dec. 18, 2013, the disclosures of which are incorporated herein by reference in their entirety.

The present invention relates to transfer station for temporarily storing at least one interchangeable die, wherein the interchangeable die can be taken out of the transfer station by a joining tool to carry out at least one joining operation which uses the interchangeable die and can be stored back in the transfer station again once the joining operation has been carried out, said transfer station having at least one interchangeable die receptacle for receiving the interchangeable die.

In addition, the present invention relates to a joining tool system having a joining tool which comprises a die receiving portion, having a multitude of interchangeable dies which comprise a die head and a die shank, and having such a transfer station.

Finally, the present invention relates to a method for joining by means of a joining tool which comprises a die receiving portion for an interchangeable die, said method having the steps—move the joining tool to a transfer station in which an interchangeable die is temporarily stored, transfer the interchangeable die into a die receiving portion of the joining tool, wherein a relative axial movement is effected between the die receiving portion and the interchangeable die and finally carry out a joining process using the interchangeable die.

BACKGROUND OF THE INVENTION

The interchangeable dies in question can be used for clinching or for riveting, in particular for punch riveting. The die feature can be, for example, an axial recess which is realized in the manner of a truncated cone, with or without an elevation in the centre, etc.

The joining tool can be a tool which is suitable for the abovementioned joining process and comprises in particular a C-frame, on the one leg of which the tool, such as for example a punching tool, is arranged, and on the other leg of which the interchangeable die is secured.

A hitherto usual concept for fastening the interchangeable die on the die receptacle consists in providing a transverse bore toward the shank receptacle in the die receiving portion. The interchangeable die can be secured by means of said transverse bore, for example using a grub screw. This type of fastening, however, allows for an automated change of die only at great expense. In addition, the transverse bore is comparatively large such that as regards strength the die receiving portion is weakened.

To avoid the last-mentioned problem, it is known from document DE 20 2006 013 082 U1 to provide a die receiving portion with a bore, fastening means which are supported on the bore wall of the die receiving portion being provided in the bore in order to fasten a tool or a tool holder releasably on the die receiving portion. This can be effected, for example, as a result of a threaded engagement or as a result of a screw which cooperates with a tool holder by means of the bore, but from an end which is opposite the die. For axial securement, the document also describes providing clamping means which can be realized according to the end face wedge principle or are realized using elastomer elements.

Although the problem of having to provide a transverse bore in the die receiving portion for securing the die is avoided in this way, an automatic die change can still only be realized with difficulty.

Interchangeable dies which can be exchanged comparatively simply are known, for example, from document DE 103 35 085 A1. The interchangeable dies shown here comprise a die head and a die shank, a radial groove being realized on the die shank. Quick change receiving means, which can be realized, for example, as latching, tightening or clamping connections, can be provided on a C-frame. In addition, the document discloses a changing station in which tool-heads and dies can be held in storage.

BRIEF SUMMARY OF THE EMBODIMENTS

Against said background, it is an object of the invention to provide an improved transfer station, an improved joining tool system and an improved joining method, wherein an automated die change at a joining tool is possible. The automated change, in this case, is preferably to be realizable on the one hand as quickly as possible. On the other hand, high holding forces, which prevent the interchangeable die being inadvertently pulled out of the die receiving portion after a joining operation, are preferably to be set up nevertheless in the axial direction between the interchangeable die and the die receiving portion.

Said object is achieved in the case of the transfer station named in the introduction in that a rotating device for rotating the interchangeable die is provided such that when the interchangeable die is taken out of storage, a rotate/insert connection between the interchangeable die and the joining tool can be set up.

In the case of the joining tool system named in the introduction, the above object is achieved in that the interchangeable dies are connectable to the die receiving portion of the joining tool in each case by means of a rotate/insert connection, wherein the transfer station is preferably realized for the purpose of holding the interchangeable dies at their die head.

In the case of the interchangeable die mentioned in the introduction, the fastening contour is preferably realized such that an insert/rotate connection can be set up between the interchangeable die and the joining tool.

In the case of the joining tool, a fastening device is preferably realized such that an insert/rotate connection can be set up between the interchangeable die and the joining tool.

Finally, the above object is achieved in the case of the joining method named in the introduction in that when the interchangeable die is taken over in the transfer station, the interchangeable die rotates.

The rotation of the interchangeable die is preferably effected around the longitudinal axis of the interchangeable die.

In the transfer station, an interchangeable die received therein is preferably held in a positive locking manner in the axial direction of the interchangeable die.

An insert/rotate connection is to be understood as a connection which is set up as a result of a relative axial offset between the interchangeable die and the joining tool and a relative rotational offset between the interchangeable die and the joining tool, it being possible to effect said two relative offsets one after another or together at least partially superimposed.

In addition, an insert/rotate connection is to be understood as such a connection where the relative rotation to set up the insert/rotate connection extends over an angle of rotation of <360°, in particular <180°. It is particularly preferred when the angle of rotation to set up the insert/rotate connection is within a range of between 30° and 150°, in particular within a range of between 45° and 135°. In a preferred embodiment, the angle of rotation is precisely 90°.

The insert/rotate connection, in this case, can be effected as a result of directly rotating the interchangeable die relative to the die receiving portion. However, it is also possible that the rotational movement is set up by a further component, for example a closure ring, as is used in some bayonet connections.

Consequently, the insert/rotate connection can be realized as a result of two simple movements, namely a longitudinal movement to insert the die shank into the shank receiving means and a rotational movement at a defined angle of rotation. Such types of movements can be automated in a comparatively simple manner and can be carried out quickly such that automated die changes are easy to realize.

In addition, an insert/rotate connection of this type can be realized such that high holding forces can be set up in the axial direction against the die being pulled out of the die receiving portion. Consequently, the joining tools can also be used "overhead" and the die being removed inadvertently after a joining operation can also be prevented in a reliable manner.

By the transfer station preferably being realized for the purpose of holding the interchangeable dies at their die head, it is possible for a die shank of the interchangeable dies to be freely accessible in each case. As a result, the interchangeable die can be taken over in the transfer station by a joining tool by a die receiving portion being moved in the axial direction toward the interchangeable die in such a manner that the die shank is inserted into a shank receiving means of the die receiving portion.

As a result of the measure of carrying out a rotation of the interchangeable die in the case of the joining method according to the invention when the interchangeable die is taken over in the transfer station, it is additionally possible to set up a rotate/insert connection between the interchangeable die and the joining tool when the interchangeable die is transferred into a die receiving portion.

The fastening contour is preferably realized such that at least one axial portion of the fastening contour extends proceeding directly from a shank end face of the die shank. The fastening contour is preferably not rotationally symmetrical. In addition, the fastening contour can be realized in a uniform or continuous manner, but can also consist of several individual contour portions which are not connected to one another.

An interchangeable die is preferably to be understood as a one-piece component where the die head and the die shank are connected together integrally. In general, however, it is also possible to provide the interchangeable die by means of a standard die in connection with a die adapter. In this case, the fastening contour can be realized on a shank of the adapter, and the die can be realized with a simple die shank without a fastening contour which is inserted substantially permanently into a receiving portion of the die adapter, for example by means of a grub screw as in the prior art.

The object is consequently fully achieved.

In the case of the transfer station according to the invention, it is advantageous when the rotating device is realized for the purpose of rotating an interchangeable die which is received in the interchangeable die receiving means.

In general, it is also certainly conceivable to provide such a rotating device in such a manner that an interchangeable die is firstly removed from the interchangeable die receiving means and is then rotated. As a result of the measure of rotating the interchangeable die in the interchangeable die receiving means itself, the transfer station is able to be realized in a structurally simple manner.

In one embodiment, it is preferred when the transfer station comprises a die rotary drive for rotating the rotating device.

In this connection, the rotational movement of the interchangeable die is realized as a result of the die rotary drive. The operation of rotating the interchangeable die, in this case, is able to be set up with greater reliability.

The die rotary drive can be a pneumatic drive, for example a pneumatic cylinder being coupled with a translation-rotation converter. The die rotary drive, however, can also be another arbitrary drive, for example an electromotive drive.

According to an alternative embodiment, the rotating device is realized for the purpose of being rotated by the joining tool.

In the case of this embodiment, the rotating device is a passive device which enables rotatability of the interchangeable die in the transfer station. The driving force for rotating the interchangeable die is applied, in the case of said embodiment, however, directly or indirectly by means of the joining tool.

A direct transmission of force from the joining tool onto the rotating device is to be understood, for example, as the joining tool being used as an actuator.

The joining tool is preferably guided by a robot. Said robot can be programmed such that the joining tool cooperates, for example, directly with the rotating device in order to rotate the same.

An indirect transmission of force is to be understood as the force being effected by means of an interchangeable die. For example, when moving into the transfer station, the die can actuate a slide which rotates the rotating device by means of a gear unit. It is also conceivable that in the case of an interchangeable die with a helix-shaped fastening contour, a relative axial movement between the interchangeable die and the joining tool causes a rotational movement of the interchangeable die which then serves to rotate the rotating device.

All in all, it is additionally advantageous when the interchangeable die receiving means comprises a U-shaped portion into which the interchangeable die can be inserted in a direction transversely with respect to its longitudinal axis.

This type of embodiment of the interchangeable die receiving means enables, on the one hand, a positive locking connection between the U-shaped portion and the interchangeable die in the axial direction of the interchangeable die as soon as the interchangeable die is inserted into the U-shaped portion. On the other hand, in the case of said type of insertion of the interchangeable die into the interchangeable die receiving means (and removal from the same) the joining tool can be guided in a comparatively simple manner such that, for example, robot programming is simplified.

In general, it is conceivable for the interchangeable die to be rotated by means of a separate device in the transfer station.

It is particularly preferred, however, when the U-shaped portion is itself realized so as to be rotatable relative to a base of the transfer station.

As a result, the interchangeable die can be rotated once the interchangeable die has been inserted into the U-shaped portion.

In this connection, it is preferred that the U-shaped portion in the case of said embodiment preferably cooperates with a rotary entrainment contour of the interchangeable die in order to secure the interchangeable die in a positive locking manner in the direction of rotation in the received state and to entrain it in the direction of rotation in the case of a rotational movement of the U-shaped portion.

In addition, it is advantageous when the U-shaped portion is movable in relation to a base of the transfer station between a transfer position and a locked position in such a manner that in the transfer position the interchangeable die is insertable into the interchangeable die receiving means and in the locked position is held securely in the transfer station.

As mentioned above, the interchangeable die is held in a positive locking manner in the U-shaped portion preferably both in the axial direction and in the circumferential direction. As a result of realizing a locked position, which is preferably achieved as a result of a rotational movement of the U-shaped portion, the interchangeable die can also be received in a positive locking manner in the radial direction in the transfer station such that inadvertent removal or inadvertent exchange of interchangeable dies can be excluded.

All in all, it is additionally advantageous when the interchangeable die receiving means is provided on a base of the transfer station, wherein the base is mounted in a floating manner in relation to a stationary framework of the transfer station.

This makes it possible for the base to carry out compensating movements when taking interchangeable dies out of storage and putting them back into storage. As a result, operating reliability can be increased and wear and tear can be reduced.

The floating bearing arrangement can be effected, for example, by one or several elastomer elements, by means of which the base is mounted on the stationary framework.

According to a further embodiment which is preferred overall, at least two interchangeable die receiving means are provided on a base of the transfer station, wherein the transfer station additionally comprises a stationary framework and wherein the base is movable with reference to the framework by means of a standby drive in order to displace in each case one interchangeable die receiving means into a standby position.

In general, it is certainly possible to develop the control of a joining tool such that the joining tool, where required, can approach substantially immovable interchangeable die receiving means at their respective positions.

In the case of the development of a standby drive, it is possible to displace each interchangeable die receiving means, where required, into the standby position such that the programming of a control means of the joining tool is simplified as said joining tool can always approach the standby position to take over interchangeable dies.

A development of this type is generally conceivable when the several interchangeable die receiving means are arranged in a linear manner. Said embodiment is particularly preferred, however, when the interchangeable die receiving means are arranged on a circle such that the standby drive can be realized as a rotary drive.

A standby drive of this type can, as also the abovementioned die rotary drive, be realized as a hydraulic drive, or also as an electromotive drive.

According to a further preferred embodiment, which in conjunction with the preamble of claim 1 represents its own independent invention, the interchangeable die receiving means of the transfer station is realized such that the interchangeable die is held at its die head and/or the die shank protrudes in relation to the interchangeable die receiving means.

On the one hand, this enables the comparatively simple provision of a rotary entrainment contour, namely preferably on the die head. A positive locking connection can be realized between the interchangeable die and the interchangeable die receiving means both in the axial direction and in the circumferential direction by means of said contour.

On the other hand, said development enables the die shank to be freely accessible at the transfer station such that it is possible for the joining tool to take it over by the joining tool being "slipped" onto the die shank in the axial direction. As a result of the interchangeable die being mounted in an axially positive locking manner in the transfer station, a defined axial position of the interchangeable die with reference to the joining tool can be set up as a result. A rotate/insert connection between the interchangeable die and the joining tool can also be set up as a result of the rotating device in the case of said type of takeover.

A further embodiment which is preferred overall provides that the transfer station has associated therewith an ID sensor which is able to detect an ID feature which is provided on the interchangeable die.

In the case of said development it can be achieved that a system for controlling the joining tool system is preferably aware at all moments which interchangeable die is situated in the transfer station, in particular in a certain interchangeable die receiving means of the transfer station, and/or which interchangeable die is connected to the joining tool. Process reliability can be increased as a result.

Provision for the joining tool system of an ID sensor which is associated with the transfer station can be provided in general. Each interchangeable die receiving means preferably has associated therewith its own ID sensor.

In the case of the joining tool system according to the invention, it is preferred when the joining tool is realized for the purpose of carrying out a joining process on a workpiece arrangement which is arranged on an interchangeable die, wherein the joining tool is able to exert an axial force onto the workpiece arrangement in a first axial direction and wherein the rotate/insert connection is realized at least in the opposite axial direction in a positive locking and/or non-positive locking manner.

As a result of said measure it can be achieved that once a joining operation has been carried out, the interchangeable die does not "get caught" inadvertently on the worked workpiece arrangement and in this way is pulled inadvertently out of the die receiving portion of the joining tool.

A rotary entrainment contour, with which a rotating device can cooperate for rotating the interchangeable die and which is preferably realized on the die head, is preferably realized on the interchangeable die.

By means of such a rotary entrainment contour it is possible, on the one hand, to rotate the interchangeable die in a targeted manner in order to set up the insert/rotate connection.

In addition, it is possible to hold the interchangeable die in a transfer station in a defined axial or rotational position as a result of the rotary entrainment contour.

As a result of the rotary entrainment contour, the interchangeable die, in this case, can preferably be set in rotation (or be held in a rotational position) in order to set up the insert/rotate connection.

According to a further preferred development, the interchangeable die is provided with identification means which are optically detectable, and/or is provided with identification means which can generate a characteristic acoustic signal which is acoustically detectable in the case of a movement of the interchangeable die relative to a die receiving portion.

In general, the identification means can also be formed by RFID means. Finally, it is also conceivable to detect the identity of an interchangeable die just as a result of its die feature which is detected, for example, by means of a camera or the like.

Means to detect the identification means, such as an ID sensor, can be arranged on the joining tool and/or in a transfer station. In addition, means to detect the identification means can also be associated just with the joining tool and/or the transfer station such that a joining tool is able to move past said detecting means before a die is stored in the transfer station and/or a die is taken over by a joining tool.

In the case of the joining tool according to the invention, it is particularly preferred when the fastening device of the die receiving portion comprises a blocking member which can cooperate with a blocking portion of a fastening contour of the interchangeable die in order to secure the interchangeable die on the joining tool in a positive locking and/or non positive locking manner in the axial direction.

The blocking member, in this case, can be an element which is rigid with reference to the die receiving portion.

It is particularly preferred when the blocking member projects into a shank receiving means of the die receiving portion.

A development of this type is preferred in particular when a fastening contour is formed on the interchangeable die by an axial recess and/or a transverse recess or a helical recess in the die shank.

In addition, it is altogether advantageous in the case of the joining tool according to the invention when there are provided tool latching means, which are realized for the purpose of interacting with die latching means in order, in a latching manner, to secure an interchangeable die which is received in the die receiving means in a rotational and/or longitudinal position.

The tool latching means, in this case, can comprise in particular a latching element which is prestressed in the latching direction by means of a spring, the latching element engaging in a suitable latching recess of the interchangeable die. In a preferred manner, the tool latching means are arranged such that they can interact with die latching means which are realized on a shank circumferential portion and/or on a shank end face of the interchangeable die which is remote from the die head, that is such that the tool latching means are arranged in the region of a circumferential region or an axial end region of the shank receiving means. As a result, the tool latching means can be realized in a simple manner as regards construction and production engineering.

In addition, it is altogether advantageous in the case of the joining tool when the die receiving portion is realized on a die holder which is releasably connectable in a rigid manner to a frame of the joining tool. In this connection, the die holder is preferably realized as a "dome" which, for example, is connectable to a frame of the joining tool, for example to a leg of a C-frame, by means of a screw-type connection of the like. As a result of the high forces occurring in the case of said joining operations, not only the interchangeable dies but also the die receiving portion are subject to a certain wear such that the releasable connection to the frame enables simple exchange.

The present invention is in particular realizable without the geometry of the interchangeable die, the die holder or the frame of the joining tool having to be enlarged. Automation of a die change can be achieved in a manner that is easy to realize. In a preferred development, the interchangeable die is connected in a positive locking manner to the joining tool in the axial direction in the connected state.

When two tangentially aligned pins are used as blocking elements in the die receiving portion, an axial recess can be realized on the die shank by radially opposite parallel flattenings which proceed from the end face of the die shank.

A conical form in the region of the bottom shank region can facilitate secure insertion of the die into the die receiving portion.

In general, the interchangeable dies can have an outer shape which corresponds substantially to standard dies.

It is obvious that the features that have been named above and the features yet to be named below can not only be used in the combination specified in each case, but also in other combinations or standing alone without departing from the framework of the present invention.

BRIEF DESCRIPTION OF THE DRAWINGS

Exemplary embodiments of the invention are shown in the drawing and are explained in more detail in the following description. The drawing is as follows:

FIG. 1 shows a schematic side view of a first embodiment of an interchangeable die according to the invention.

FIG. 2 shows a schematic cross sectional view along the line II-II of FIG. 1, part of the head portion and an embodiment of a joining tool according to the invention additionally being shown.

FIG. 6 shows a schematic representation of a joining tool system with a transfer station, in which several interchangeable dies according to the invention are stored temporarily, and with a schematically indicated joining tool according to a further embodiment of the present invention, as well as with identification detecting means.

FIG. 7 shows a side view of an embodiment of an interchangeable die according to the invention with a first form of identification means.

FIG. 8 shows a representation of the interchangeable die of FIG. 7 after a rotation about 90°.

FIG. 9 shows a representation corresponding to FIG. 8 of a further embodiment of an interchangeable die with a further embodiment of identification means.

FIG. 10 shows a representation corresponding to FIG. 8 of a further embodiment of an interchangeable die with a further embodiment of identification means.

FIG. 11 shows a representation corresponding to FIG. 8 of a further embodiment of an interchangeable die with a further embodiment of identification means.

FIG. 12 shows a representation corresponding to FIG. 8 of a further embodiment of an interchangeable die with a further embodiment of identification means.

FIG. 16 shows a perspective schematic view of a further embodiment of an inventive transfer station.

FIG. 17 shows a schematic top view of a further embodiment of an inventive transfer station in a transfer position.

FIG. 18 shows the transfer station of FIG. 17 in a locked position.

FIG. 19 shows a schematic top view of another embodiment of an inventive transfer station.

DETAILED DESCRIPTION OF THE PREFERRED EMBODIMENTS

Figure 3:
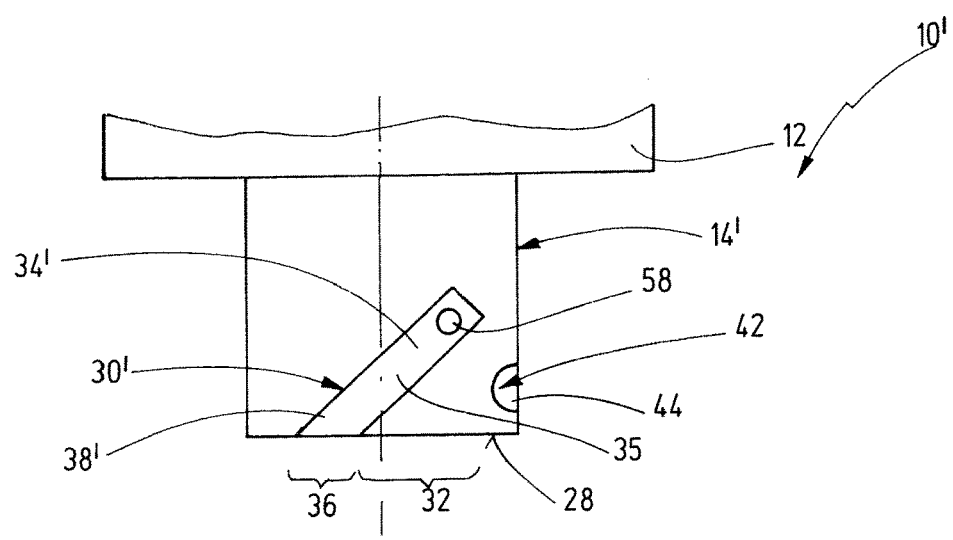
FIG. 3 shows a representation corresponding to FIG. 1 of a further embodiment of an interchangeable die according to the invention.

FIGS. 1 and 2 show a schematic representation from the side of an embodiment of an interchangeable die according to the invention which is given the general reference 10.

The interchangeable die 10 comprises a die head 12 which is preferably circular in cross section, as well as a die shank 14 which is also circular in cross section. The diameter of the die shank 14 is preferably smaller than that of the die head 12. A longitudinal axis 16 is shown.

The die head 12 comprises a head end face 20 which is remote from the die shank 14. A die feature 18 is realized on the head end face 20, for example in the form of an axial recess, as is usual for punch riveting or for other joining processes.

A rotary entrainment contour 22, which can be formed, for example, by one or two radial grooves which extend in a chord-like manner, is realized on a circumferential portion 24 of the head of the die head 12.

A circumferential portion 26 of the shank is shown in FIG. 1. A shank end face 28 is remote from the die head 12.

A fastening contour 30 is realized on the die shank 14. The fastening contour 30 includes a first circumferential portion 32 which comprises a blocking portion 34. The blocking portion 34 can be realized on the die shank 14, for example, by a transverse recess 35 which extends in the direction transversely to the longitudinal axis 16. The fastening contour 30 additionally includes a second circumferential portion 36 which is realized as release portion 38. The release portion 38 preferably includes a longitudinal recess 39 which extends parallel to the longitudinal axis 16. The first circumferential portion 32 and the second circumferential portion 36 connect to one another in the circumferential direction such that a substantially L-shaped contour is produced, as is shown in FIG. 1. The fastening contour 30 extends over a circumferential angle which is preferably smaller than 360° and in particular is smaller than 180°. The circumferential angle preferably lies within a range of between 45° and 135°, in particular within a range of between 70° and 110°.

The interchangeable die 10 additionally comprises die latching means 42 which are preferably realized on the die shank 14. The die latching means 42 can be formed, for example, by a latching recess 44, as is shown in FIGS. 1 and 2.

Identification means 46 are preferably realized on the die head 12.

FIG. 2 shows a schematic sectional view in conjunction with a joining tool 50. The joining tool 50 comprises a die receiving portion 52 which includes a shank receiving means 54 in the form of a recess. The inside diameter of the shank receiving means 54 corresponds to the outside diameter of the die shank 14. In addition, the joining tool 50 includes a fastening device 56 which, in the present case, comprises a blocking member 58 which extends in the radial direction into the shank receiving means 54. The blocking member 58 can be formed, for example, by a pin or the like which is aligned radially.

The joining tool 50 additionally comprises a tool latching means 60 which preferably include a latching element such as a ball 62 and a spring 64.

The tool latching means 60 can interact with the die latching means 42, as is shown in FIG. 2. In this connection, the latching element 62 engages in a latching recess 44.

FIG. 2 shows the interchangeable die 10 in a rotational position B where the blocking member 58 engages in the blocking portion 34.

Prior to this, the interchangeable die 10 has been inserted in the axial direction into the die receiving portion 52 by the die shank 14 having been inserted into the shank receiving recess 54 such that the blocking member 58 was aligned in the circumferential direction with the release portion 38. As a result, axial insertion was possible as the release portion 38 extends from the shank end face 28. The interchangeable die 10 was then rotated with reference to the die receiving portion 52 such that the blocking member 58 passed into the blocking portion 34. Consequently an insert/rotate connection is set up. In this connection, the insert/rotate connection provides a connection which is positive locking in the axial direction between the interchangeable die 10 and the die receiving portion 52 in the position shown in FIG. 2.

In said position the tool latching means 60 are additionally in engagement with the die latching means 42 such that said relative rotating position is not inadvertently released (for example as a result of the joining tool 50 making rapid movements).

A further embodiment of an interchangeable die is shown in FIG. 3 and given the general reference 10'. As regards design and method of operation, the interchangeable die 10' corresponds in general to the interchangeable die 10. Identical elements are consequently characterized by identical references. It is essentially the differences that are explained below.

The interchangeable die 10' comprises a die shank 14' with a fastening contour 30' which is realized in a helical manner on the outer circumference of the die shank 14'. The fastening contour 30' extends once again from the shank end face and comprises a narrow second circumferential portion 36 with a release portion 38', to which the helical contour connects by way of the blocking portion 34'. In the rotational position shown in FIG. 3, a blocking member 58 of a die receiving portion 52 is situated in the region of an end of the fastening contour 30'. In said position the interchangeable die 10' is secured axially by a combined positive and non-positive locking closure in relation to forces trying to withdraw it out of the die receiving portion 52. The blocking member 58 can be supported, in this case, on the blocking portion 34' which is realized by the helical groove on the outer circumference of the shank 14'. The pitch of the fastening contour 30' is preferably such that self-locking is not achieved. Accordingly, the rotational position relative to the die receiving portion 52 must be additionally secured by a latching engagement, the latching force preferably being greater than in the case of the embodiment in FIG. 1. The manner of the latching means on the interchangeable die 10' and the die receiving portion 52, however, can otherwise be realized in a substantially identical manner.

As also in the case of the preceding embodiment, a latching recess 44 can also be realized in the region of the shank end face 28.

Figure 4:
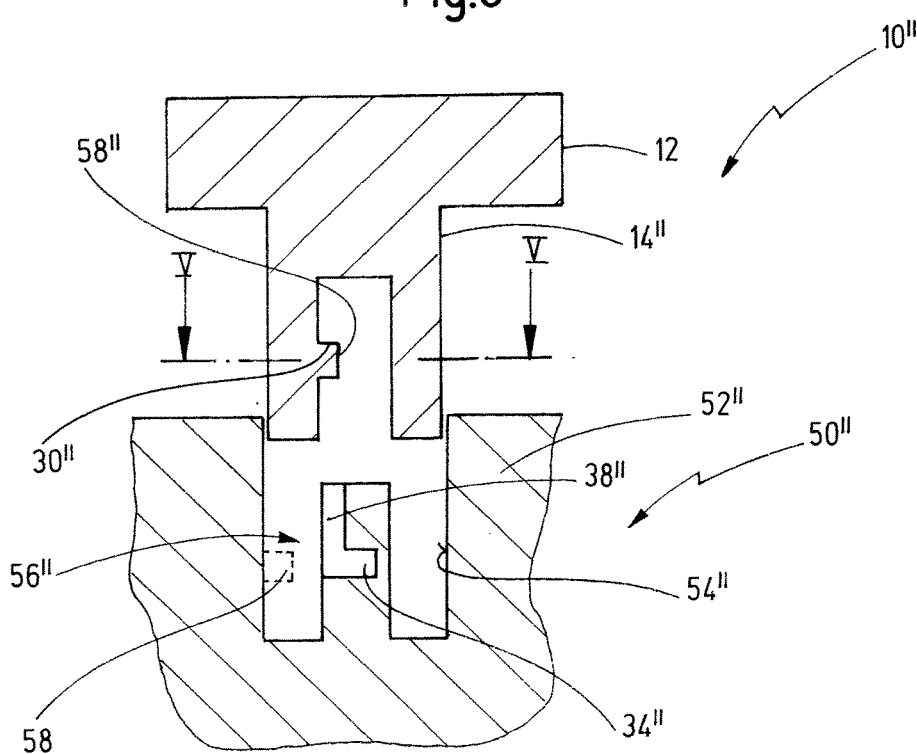
FIG. 4 shows a representation corresponding to FIG. 1 of a further embodiment of an interchangeable die according to the invention and of a further embodiment of a joining tool according to the invention.
Figure 5:
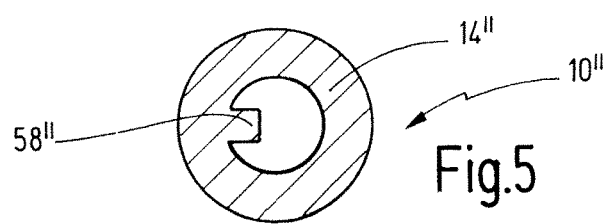
FIG. 5 shows a sectioned view of the interchangeable die along the line V-V of FIG. 4.

FIGS. 4 and 5 show a further embodiment of an interchangeable die 10" which corresponds generally to the interchangeable die 10 of FIGS. 1 and 2 as regards design and method of operation. Identical elements are consequently characterized by identical references. It is essentially the differences that are explained below. The same applies to a joining tool 50" which is shown in FIG. 4.

The interchangeable die 10" comprises a die shank 14" which is realized with a blind hole which proceeds from the shank end face. A blocking member, which is given the reference 58" in FIG. 4 and which forms the fastening contour 30" of the interchangeable die 10", protrudes in the interior of the blind hole.

In the case of said embodiment, the joining tool 50" die receiving portion 52" includes a shank receiving recess 54" which comprises a fastening device 56" in the form of a journal which projects axially from the bottom and is designed for the purpose of penetrating the blind hole 31 of the die shank 14". A fastening contour 30", 34", and 38" is shown in FIG. 5 and which, as regards the design, can correspond to the fastening contour 30 of the interchangeable die 10 in FIG. 1, is realized on the journal 56". In the case of said embodiment, the locations of the blocking member 58 and fastening contour 30 between the interchangeable die 10" and the die receiving portion 52" are consequently reversed compared to the embodiment of FIG. 1.

The reference 58 in FIG. 4 indicates in a schematic manner a blocking member, as would be used in the case of the embodiment in FIG. 1.

FIG. 6 shows a portion of a joining tool 50, the joining tool 50 comprising a die holder 68 which is rigidly connected by means of a releasable connection 70 (for example a screw-type connection) to a frame 72 of the joining tool 50, for example a C-frame for punch riveting processes.

The die holder 68 is consequently exchangeable in a simple manner.

The die receiving portion 52, with the shank receiving means 54 and a blocking member 58 which projects into the shank receiving means 54, is realized on the die holder 68.

A joining tool system 74 is formed by the joining tool 50 together with a plurality of interchangeable dies 10 and a transfer station 76.

The transfer station 76 serves for temporarily storing at least one, in particular a plurality of interchangeable dies 10. FIG. 6 shows a schematic representation of a transfer station 76 in which two interchangeable dies 10 can be stored. The transfer station 76 is constructed such that the interchangeable dies 10 are arranged in a linear manner. It is obvious, however, that the interchangeable dies can also be arranged along a circuit.

The transfer station 76 comprises a base 78 which comprises a first interchangeable die receiving means (receptacle) 80 and a second interchangeable die receiving means (receptacle) 82. The interchangeable die receiving means 80, 82 are constructed identically in each case such that just the first interchangeable die receiving means 80 will be described below.

The first interchangeable die receiving means 80 includes a U-shaped portion 84 which is rotatable relative to the base 78.

The U-shaped portion 84 is arranged substantially horizontally. The U-shaped portion 84 is dimensioned such that a respective interchangeable die 10 can be moved into the U-shaped portion 84 in the substantially horizontal position, in particular, however, in a direction transversely with respect to the longitudinal axis of the interchangeable die 10. The U-shaped portion is additionally realized such that it cooperates with the rotary entrainment contour 22 of the interchangeable die 10 in order, in the received state, to hold the interchangeable die 10 in the direction of rotation, in particular in a positive locking manner.

The interchangeable die 10 is held in the interchangeable die receiving means 80 such that the die shank 14 thereof is exposed, that is it is accessible for a transfer into the die receiving portion 52.

The U-shaped portion 84 has associated therewith a rotating device 88. The U-shaped portion 84 can be rotated relative to the base 78 by means of the rotating device 88 between the position shown in FIG. 6 where the U-shaped portion is open and a second position where the U-shaped portion 84 has rotated with reference to the base 78 such that the interchangeable die 10 is surrounded in a circumferential manner in part by the U-shaped portion and in part by the base 78. As a result, the interchangeable die 10 can be received in a locked manner in said second position in the transfer station 76.

The U-shaped portion 84 can also be rotated back again by means of the rotating device 88 in order to open the interchangeable die receiving means 80 and to enable the interchangeable die 10 to be removed out of the transfer station 76.

The rotating device 88 can be an active rotating device 88. A rotary drive which rotates the U-shaped portion 84 (and preferably all the U-shaped portion 84 at the same time) can be provided for this purpose. The rotary drive can be, for example, a pneumatic drive, an electric drive or another drive.

The rotating device 88, however, can also be a passive rotating device which simply makes rotation possible. In this connection, a drive for rotating the U-shaped portion can be effected, for example, as a result of the tool 50 generating this type of rotational movement in a direct or indirect manner.

The base 78 is mounted on a stationary framework 90 by means of a plurality of elastic elements 92 such that the base 78 is mounted in a floating manner. This makes it possible for the base to carry out compensating movements when placing interchangeable dies into storage and when removing them from storage. This increases the operating reliability and reduces wear and tear.

The transfer of an interchangeable die 10 out of the transfer station 76 into the die receiving portion 52 is effected as follows, the method proceeding from a state where the interchangeable die 10 is locked in the transfer station 76, the U-shaped portion 84 consequently being rotated such that the interchangeable die receiving means 80 is closed.

In a first step, the tool 50 is moved (in particular by means of a robot or the like) such that the die receiving portion 52 is moved toward the die shank 14, as is shown with the reference 94. The rotational position of the tool 50, in this case, is chosen such that the blocking member 58 is aligned with the release portion 38 of the fastening contour 30 in the circumferential direction. Consequently, the die shank 14 is able to be inserted into the shank receiving means 54. As soon as the blocking member 58 is situated at the level of the blocking portion 34 (see FIG. 1), when viewed in the axial direction, the U-shaped portion 84 is rotated by means of the rotating device 88, as is shown with the reference 96.

As a result of the rotational movement, the blocking member 58 is transferred into the blocking portion 34. At the same time, the interchangeable die receiving means 80 is opened such that the U-shaped portion 84 is exposed, as is shown in FIG. 6.

The interchangeable die 10 can then be removed out of the interchangeable die receiving means 80 in a direction transversely with respect to its longitudinal axis, as is shown with the reference 98.

An interchangeable die 10 is placed in storage in the reverse sequence. First of all the interchangeable die is slipped in a translational manner into the open interchangeable die receiving means 80 by means of the tool 50 (against the direction of the arrow 98). The interchangeable die 10 is then rotated by means of the rotating device 88 (against the direction 96). As a result, the blocking member 58 is moved out of the blocking portion 34 into the release portion 38 of the fastening contour 30. At the same time, the interchangeable die 10 is locked in the interchangeable die receiving means 80. The tool 50 can then be removed axially from the die shank 14, against the direction of the arrow 94.

In many cases it is desirable to know and to document which interchangeable die is situated where inside the joining tool system 74. To this end, as mentioned above with reference to FIG. 1, the interchangeable die 10 can comprise an identification means 46.

In a corresponding manner, the joining tool system 74 can comprises an identification means sensor 100 (identification detecting means) which can be associated with the transfer station 76 and/or the tool 50. The ID sensor 100 can be an optical sensor, such as a scanner, a camera or the like. The identification means sensor 100, however, can also be an acoustic sensor (microphone) or an RFID sensor.

The identification means sensor 100 can be arranged next to the transfer station 76, as is shown in FIG. 6. In this case, the tool could be moved past the identification means sensor 100 prior to an operation for putting into storage or to an operation for removing out of storage in order to document the process for putting into storage or the process for removing out of storage.

For increased security, however, it is desirable for each interchangeable die receiving means 80, 82, etc. to have associated therewith its own identification means sensor 100.

For the case where the identification means sensor 100 includes a camera or an optical scanner, it is generally also conceivable not to provide any separate identification means 46 on the interchangeable die 10. It is conceivable, rather, for the respective interchangeable die to be identified as a result of its die feature 18.

FIGS. 7 to 12 show different types of identification means 46. FIGS. 7 and 8 show an interchangeable die 10 with identification means 46 which are realized in the form of radial grooves 102 on the outer circumference of the die shank 14. The grooves are characteristic of each interchangeable die. Means, which generate a noise when said grooves 102 are travelled over, are preferably provided on the joining tool 50 in this case. Said means can be formed, for example, by the tool latching means 60 or other latching means. The characteristic noise can then be received by an acoustic sensor which evaluates the acoustic signal to identify the interchangeable die 10.

FIG. 9 provides a view which is comparable to FIG. 8, grooves which are provided with the reference 102a in FIG. 9 also being used for identification. However, the grooves 102a in FIG. 9 are realized as longitudinal grooves which provide a characteristic feature for the interchangeable die 10.

FIGS. 10 to 12 in each case show optically detectable identification means 46. FIG. 10, in this case, shows a barcode 102b which is mounted on the circumferential portion 24 of the head. FIG. 11 shows a 2D code 102c which is mounted on the circumferential portion 24 of the head. FIG. 12 shows an alphanumeric code 102d which is mounted on the circumferential portion 24 of the head.

When mounting identification means 46 on the circumferential portion 24 of the head, it is preferred when they are arranged between the rotary entrainment contours 22 in the circumferential direction.

Figure 13:
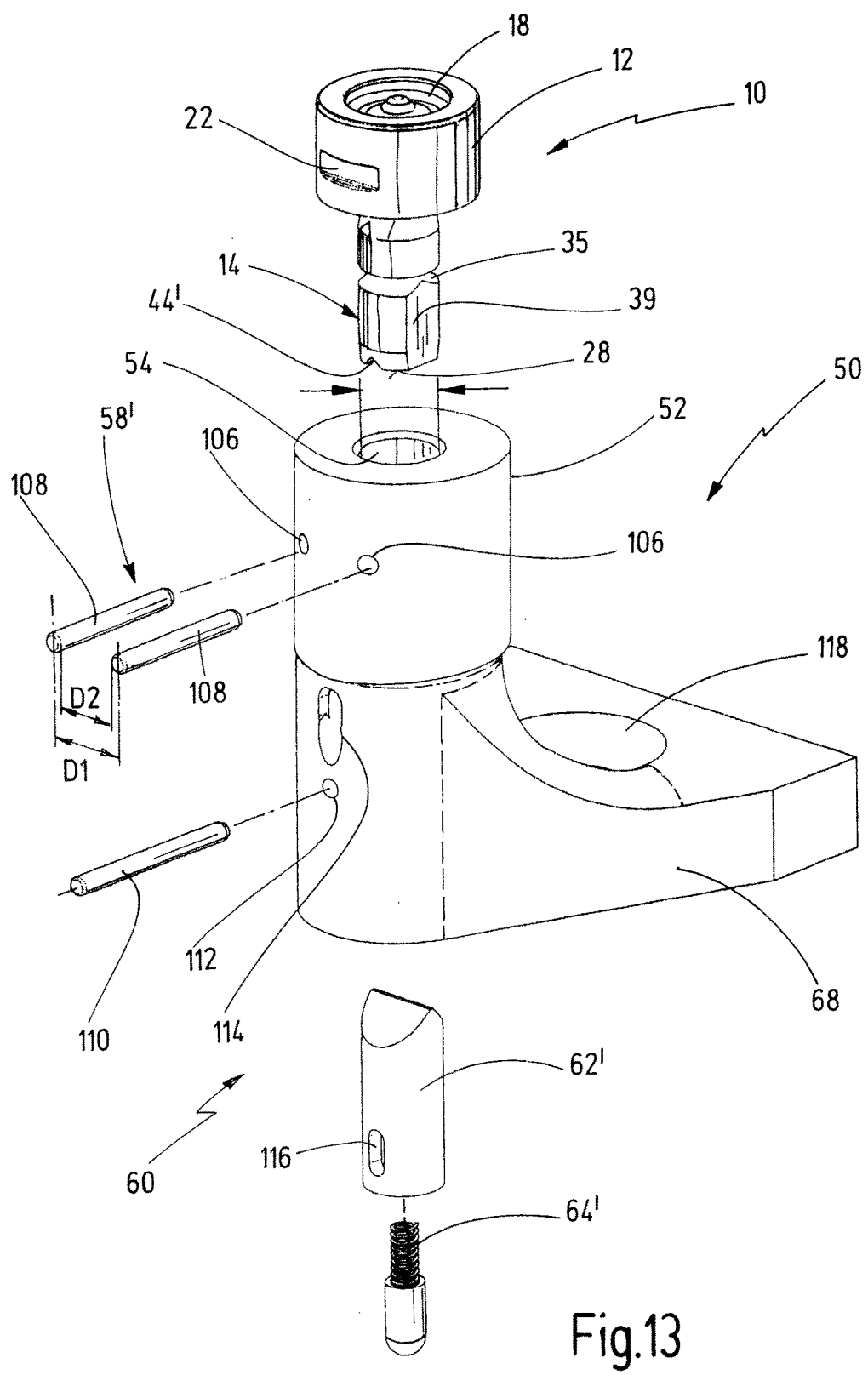
FIG. 13 shows a perspective view of an embodiment of a joining tool with a die holder according to a further embodiment of the invention as well as a perspective view of an interchangeable die according to a further embodiment of the invention.

FIG. 13 shows a further embodiment of a joining tool 50 with a die holder 68. An interchangeable die 10 is additionally shown here. Said embodiments generally correspond to the embodiment in FIG. 1 as regards design and method of operation. Identical elements are consequently provided with identical references. It is essentially the differences that are explained below.

The interchangeable die 10 comprises a die shank 14 which includes a circumferential groove with an approximately triangular cross section for forming the transverse recess 35. The release portion 38 is formed by two parallel, diametrically opposite flattenings which form the longitudinal recesses 39 and of which only one is provided in FIG. 13.

A latching recess 44', which is realized as a diametrical recess which is triangular in cross section, is realized on the shank end face 28.

The die receiving portion 52 comprises two thin locking pin bores 106 at an axial height corresponding to the transverse recess 35. The locking pin bores 106 are aligned tangentially to the shank receiving means 54. Two locking pins 108 are inserted into the locking pin bores 106. The spacing between the locking pins 108 (shown by the reference D2 in FIG. 13) corresponds, in this case, to the radial spacing between the longitudinal recesses 39 of the interchangeable die 10. The spacing between the longitudinal axes of the locking pins 108 (shown by the reference D1 in FIG. 13) is preferably identical to the inside diameter of the shank receiving means 54.

The dimensions are consequently chosen such that the interchangeable die 10 can be inserted into the shank receiving means 54 by way of its die shank 14 in the representation shown in FIG. 13 as the longitudinal recesses 39 fit precisely between the locking pins 108. As soon as the die head 12 rests on the surface of the die receiving portion 52, the locking pins 108 are situated at the axial height of the transverse recess 35 such that the interchangeable die 10 is able to be rotated inside the shank receiving means 54, in particular about 90°, in order to set up a positive locking insert/rotate connection in this manner.

To realize the tool latching means 60, a latching element is provided in the form of a hollow bushing 62' which tapers at its one end in a wedge-shaped manner such that a latching cog is produced which is able to engage in the latching recess 44'. As is shown in detail in FIGS. 14 and 16, a spring element 64', which is supported in the axial direction on a retaining pin 110, is arranged inside the latching element 62'. The retaining pin 110, in this case, is inserted in the die holder 68 by means of a retaining pin bore 112 and in the latching element 62' by means of longitudinal openings 116.

The mounting of said latching means 60 is comparatively simple as the shank receiving means 54 is preferably realized as an axially continuous bore in the die holder 68.

In addition, an ejection opening 114, which extends inclinedly upward in the direction toward the shank receiving means 54 and which is realized in the die holder 68, can be seen in FIG. 13. An interchangeable die 10 can be forcibly ejected by means of the ejection opening 114 insofar as said interchangeable die was clamped or the like in the die holder 68.

A fastening bore 118 for the releasable fastening of the die holder 68 on a framework is shown in FIG. 13 with the reference 118, similar to the function as shown in FIG. 6.

The following FIGS. 14 to 23 show further embodiments of transfer stations which correspond in general to the transfer stations 76 of FIG. 6 as regards design and method of operation. Identical elements are consequently characterized by identical references. It is essentially the differences that are explained below.

Figure 14:
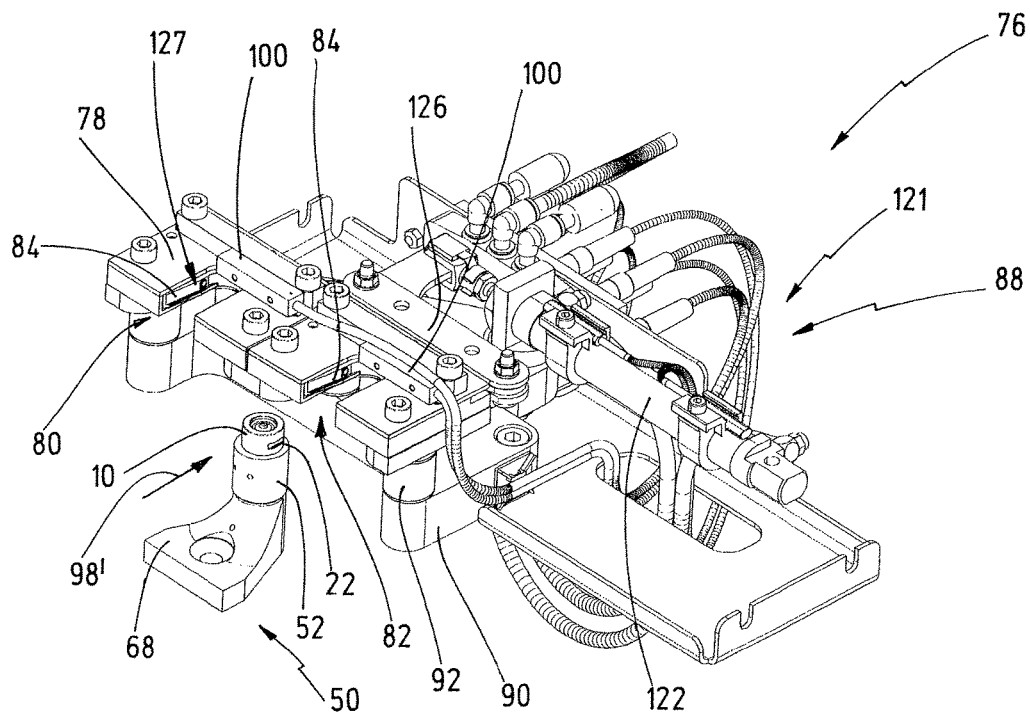
FIG. 14 shows a perspective view of another embodiment of transfer station in a transfer position.
Figure 15:
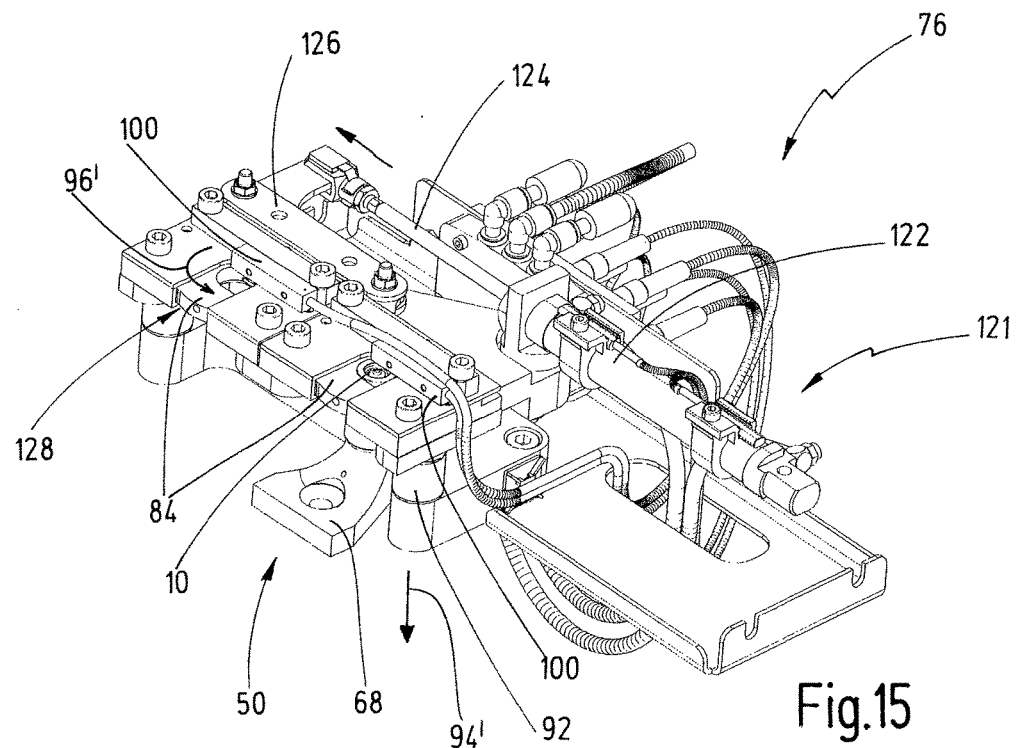
FIG. 15 shows the transfer station of FIG. 14 in a locked position.

The transfer station 76 shown in FIGS. 14 and 15 comprises a rotary drive 121 for the rotating device 88. The rotary drive 121 is formed by a pneumatic cylinder 122, the piston rod 124 of which is connected to a slide 126. The slide 126 is designed for the purpose of moving U-shaped portions 84 of two interchangeable die receiving means 80, 82 between a transfer position 127, as shown in FIG. 14, and a locked position 128, as shown in FIG. 15.

In the case of the transfer position shown in FIG. 14, a joining tool 50 can be inserted transversally into the interchangeable die receiving means (the interchangeable die receiving means 82 in FIG. 14) such that the U-shaped portion cooperates with the head of the interchangeable die 10, more precisely with a rotary entrainment contour 22, in such a manner that the interchangeable die 10 is then held in a positive locking manner in the interchangeable die receiving means 82 in the axial direction and in the circumferential direction.

By rotating the U-shaped portions 84 of the transfer station 127 into the locked position 128, as shown in FIG. 15 with the reference 96', the interchangeable die 10 can also be held in a positive locking manner in the radial direction in the transfer station 76.

As a result of the rotational movement 96', the interchangeable die 10 is rotated inside a die receiving portion of the joining tool 50, from a blocked position into a release position such that the joining tool is then able to be pulled from the die shank of the interchangeable die 10 in the axial direction, as is shown in FIG. 15 with the reference 94', in order to release the previously set-up rotate/insert connection between the interchangeable die 10 and the joining tool 50. An interchangeable die 10 is transferred out of the transfer station 76 in precisely the reverse sequence.

FIG. 16 shows a further embodiment of a transfer station 76 which can correspond in general to the embodiment of FIGS. 14 and 15 as regards design and method of operation. In this connection, however, the base 78 of the transfer station 76 is not secured directly on a stationary framework 90 by means of elastic elements 92. Rather, the base 78 is secured directly, or by means of elastic elements 92, on a carriage 130 which is able to be displaced with reference to the stationary framework 90, as shown in FIG. 16 with the reference 132. As a result, it is possible to displace each interchangeable die receiving means 80, 82 into a standby position which is shown in FIG. 16 with the reference 134 such that a joining tool just has to be adapted or taught to one transfer position with reference to the transfer station.

A standby drive for displacing the carriage 130 with reference to the stationary framework 90 is indicated schematically in FIG. 16 with the reference 136. Said standby drive 136 can be realized in a pneumatic or electromotive manner.

FIGS. 17 and 18 show a further embodiment of a transfer station 76. Said transfer station comprises a slide 138 which is displaceable axially with respect to the base 78 and on which a U-shaped portion 84 is displaceably mounted. The U-shaped portion 84 is coupled with the base 78 by means of a gear unit 140. The gear unit 140 can comprise, for example, a member which is pivotably mounted so as to be pivot on the base 78 and pivotably mounted so as to pivot on the U-shaped portion 84. When a joining tool 50 moves an interchangeable die 10 in the transverse direction into the U-shaped portion 84, the slide 138 is displaced parallel thereto into the base 78, which results in the U-shaped portion 84 being rotated by means of the gear unit 140, as is indicated in FIG. 17 with an arrow.

This type of transfer station consequently provides a passive rotating device 88 such that a separate die rotary drive, as the rotary drive 121 in FIGS. 14 and 15, is not necessary.

In the case of the above embodiments, several interchangeable die receiving means 80, 82 are arranged in a linear manner. However, it is also possible to arrange a plurality of interchangeable die receiving means 80, 82 along a circle. Such a concept is shown schematically in FIG. 19. In this connection, the base 78 can be circular, a plurality of interchangeable die receiving means 80, 82, etc. being provided on the outer circumference of the base 78. The base 78, in this case, is preferably rotated by means of a standby drive 136 in order to move a desired interchangeable die receiving means into a standby position, similarly as is shown in FIG. 16. In addition, a transfer station of this type can also have associated therewith a rotary drive 121 which can rotate U-shaped portions of the respective interchangeable die receiving means between a transfer position and a locked position. Two schematic pneumatic cylinders which can fulfil said function are indicated in FIG. 19 for this purpose. The standby drive 136, in this case, could operate in a stepped manner.

As an alternative to this, however, a standby drive 136 and a rotary drive 121 can also be formed by an electric motor or by two electric motors. When one electric motor or one other individual rotary drive is used, it is also possible to realize the two functions (rotating the die and rotating into a standby position) by means of free-running or the like.

Figure 20:
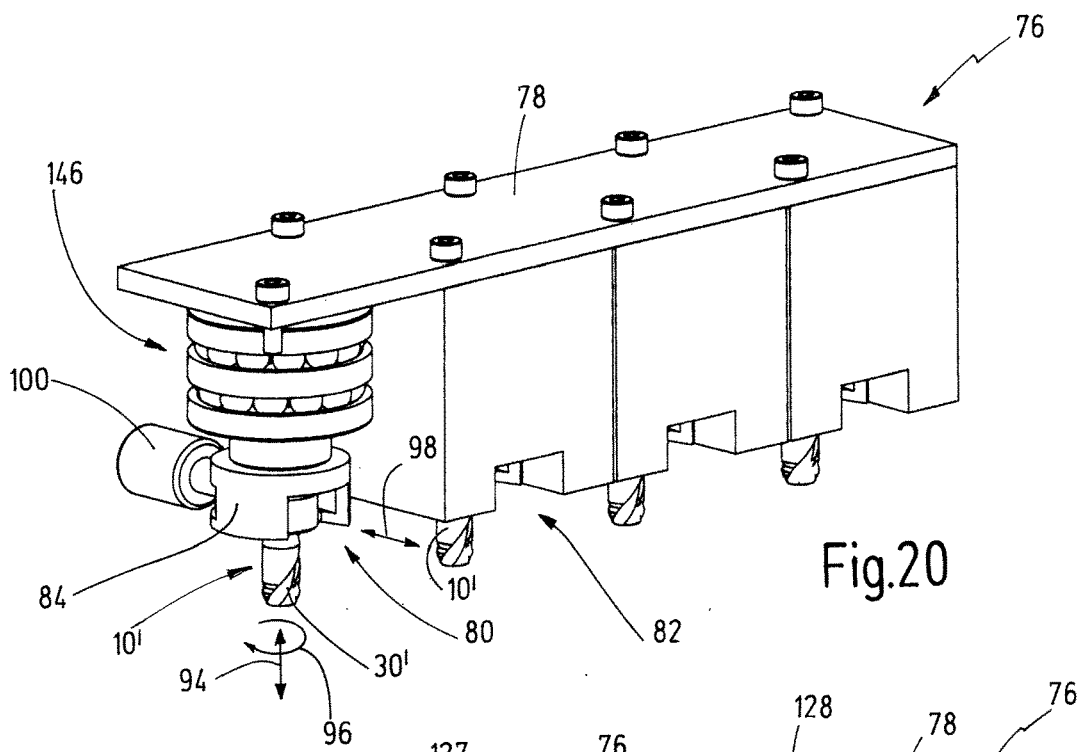
FIG. 20 shows a perspective, partially sectioned view of another embodiment of an inventive transfer station.
Figures 21, 22:
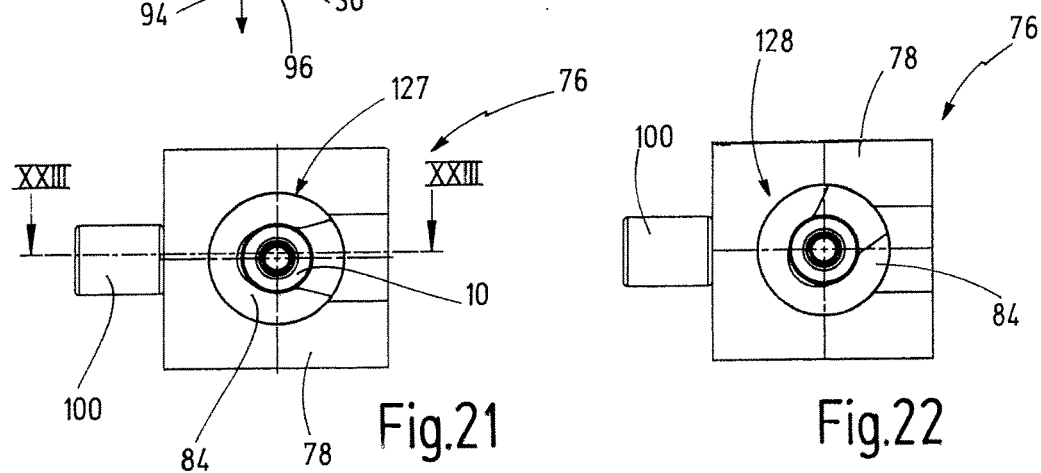
FIG. 21 shows a schematic top view on a interchangeable die receptacle of the transfer station of FIG. 20 in a transfer position.
FIG. 22 shows the interchangeable die receptacle of FIG. 21 in a locked position.

FIGS. 20 to 23 show a further embodiment of a transfer station 76 which is suitable in particular for interchangeable dies, as are shown schematically in FIG. 3. In this connection, a U-shaped portion 84 can preferably be supported on a base 78 of the transfer station 76 by means of an axial bearing 146. A rotary drive is not necessary in this connection. For in the case of a relative axial movement 94 between the joining tool and the interchangeable die 10', a relative rotation of the interchangeable die 10' is automatically brought about, as is shown in FIG. 20 with the reference 96.

The transfer station 76 additionally comprises for each interchangeable die receiving means 80, 82, etc. in each case its own ID sensor which is preferably realized such that it is able to detect an identification means which is realized on the die head of an interchangeable die which is received in the interchangeable die receiving means.

Figures 23, 24:
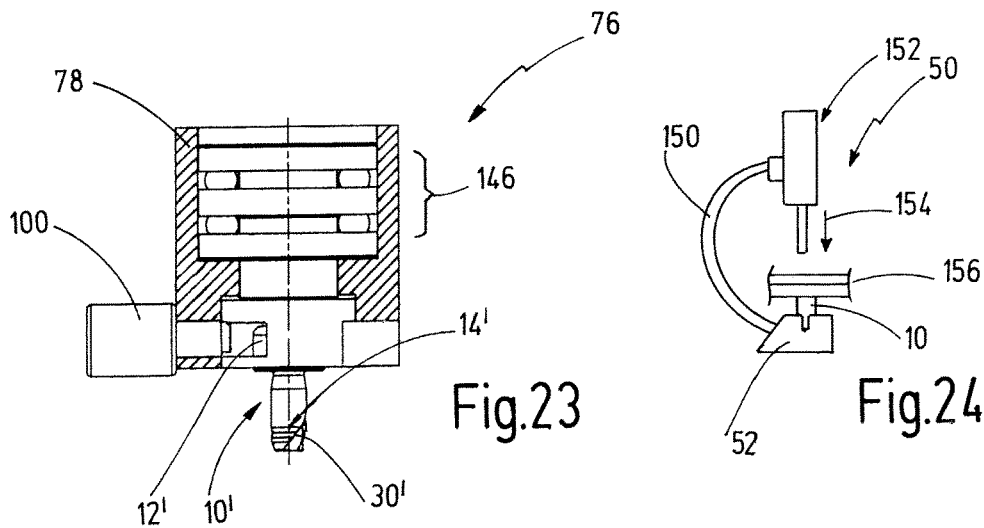
FIG. 23 shows a sectional view along the line XXIII-XXIII of FIG. 21.
FIG. 24 shows a schematic view of a joining tool including a work piece arrangement on which a joining process is to be conducted.

FIG. 24 finally shows a joining tool 50 with a C-frame 150, on the one leg of which a joining tool, such as for example a punching tool 152, is mounted which is designed to exert an axial force 154. A die receiving portion 52 for receiving an interchangeable die 10 is realized on the other leg of the C-frame.

A joining operation is carried out by a workpiece arrangement 156 being placed onto the interchangeable die 10 and the axial force 154 then being exerted onto the workpiece arrangement 156.

In this connection, material from the workpiece arrangement 156 can penetrate into a die feature 18. When the workpiece arrangement 156 is released from the interchangeable die 10, in this case, axial forces can occur. The interchangeable die 10 is prevented from being released from the die receiving portion 52 in this connection as a result of the rotate/insert connection between the interchangeable die 10 and the die receiving portion 52.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A transfer station for temporarily storing an interchangeable die defining a longitudinal axis and including a die head and a die shank, and wherein the interchangeable die can be taken out of the transfer station by a joining tool to carry out a joining operation which uses the interchangeable die and can be returned to the transfer station again once the joining operation has been carried out, said transfer station comprising:
    a base;
    a die receptacle located on the base and open in a radial direction transverse to the longitudinal axis and into which the interchangeable die can be inserted in the radial direction transversely with respect to the longitudinal axis;
    a rotating device operable for rotating the die relative to the base for presentation to and engagement with the joining tool; and
    a U-shaped portion located in the base and partially around the receptacle; and the U-shaped portion is rotatable in relation to the base between a transfer position, wherein the U shaped portion is open in the radial direction and a locked position, wherein the U-shaped portion closes the receptacle in the radial direction; and in the transfer position the interchangeable die is insertable into the die receptacle, and in the locked position the die is held securely in the transfer station.

2. A transfer station according to claim 1, and further comprising a stationary frame, and the base is mounted to the frame in a floating manner.

3. A transfer station according to claim 1, wherein the die includes a rotary entrainment contour partially defined in a circumferential portion of the die head by a chord-like groove, and: the die receptacle is configured to hold the die by the entrainment contour.

4. A transfer station according to claim 1 wherein the die receptacle is configured such that the die shank protrudes in relation to the die receptacle.

5. A transfer station according to claim 1, and further comprising an ID sensor operable to read an ID device located on the interchangeable die.

6. A joining tool system comprising:
    a plurality of interchangeable dies, each of a die defining a longitudinal axis and including a die head and a die shank;
    a joining tool including a die receiving portion operable for engaging a die; and
    a transfer station including:
        a base; a die receptacle located on the base and open in a radial direction transverse to the longitudinal axis and into which the interchangeable die can be inserted in the radial direction transversely with respect to the longitudinal axis;
        a rotating device operable for rotating the die relative to the base for presentation to and engagement with the joining tool;
        a U-shaped portion located in the base and partially around the receptacle; and the U-shaped portion is rotatable in relation to the base between a transfer position, wherein the U shaped portion is open in the radial direction, and a locked position, wherein the U-shaped portion closes the receptacle in the radial direction; and in the transfer position the interchangeable die is insertable into the die receptacle and in the locked position the die is held securely in the transfer station; and
    wherein the plurality of dies are connectable in each case to the die receiving portion of the joining tool by an engagement motion including an insert movement and a rotate movement; and the rotate movement is between an angle of relative rotation of 45° to 135° between the interchangeable die and the joining tool.

7. A joining tool system according to claim 6, wherein the joining tool is operable for executing a joining process on a workpiece arrangement which is arranged on the interchangeable die, and wherein the joining tool is operable to exert an axial force onto the workpiece arrangement in a first axial direction, and wherein the insert movement is realized in the opposite axial direction in one of a positive locking or non-positive locking manner.

* * * * *